United States Patent
Richardson (10) Patent No.: US 11,201,528 B2
(45) Date of Patent: Dec. 14, 2021

(54) INDUCTION MOTOR FOR USE IN DRONES

(71) Applicant: Superior Essex Inc., Atlanta, GA (US)

(72) Inventor: Christopher Paul Richardson, Fort Wayne, IN (US)

(73) Assignee: SUPERIOR ESSEX INC., Atlanta, GA (US)

( * ) Notice: Subject to any disclaimer, the term of this patent is extended or adjusted under 35 U.S.C. 154(b) by 138 days.

(21) Appl. No.: 16/569,389

(22) Filed: Sep. 12, 2019

(65) Prior Publication Data

US 2020/0091803 A1 Mar. 19, 2020

Related U.S. Application Data

(60) Provisional application No. 62/730,566, filed on Sep. 13, 2018.

(51) Int. Cl.
*H02K 17/16* (2006.01)
*H02K 9/22* (2006.01)
*B64C 39/02* (2006.01)
*B64D 27/24* (2006.01)

(52) U.S. Cl.
CPC ............ *H02K 17/165* (2013.01); *H02K 9/22* (2013.01); *B64C 39/024* (2013.01); *B64C 2201/042* (2013.01); *B64D 27/24* (2013.01)

(58) Field of Classification Search
CPC .......... H02K 17/165; H02K 9/22; H02K 1/30; H02K 5/1735; H02K 17/16; H02K 17/18; H02K 17/185; H02K 3/00–3/528; B64C 2201/042; B64C 39/024; B64D 27/24
See application file for complete search history.

(56) References Cited

U.S. PATENT DOCUMENTS

| | | | |
|---|---|---|---|
| 2,140,365 A | 12/1938 | Lenehan | |
| 3,218,491 A | 11/1965 | Walsh et al. | |
| 3,987,324 A | 10/1976 | Linkous | |
| 5,508,571 A * | 4/1996 | Shafer, Jr. ............... | H02K 3/28 310/179 |
| 5,808,391 A | 9/1998 | Avakian et al. | |
| 2003/0218400 A1* | 11/2003 | Rimmel ............... | H02K 17/165 310/166 |
| 2007/0063595 A1 | 3/2007 | Habibi et al. | |
| 2009/0096311 A1* | 4/2009 | Even ..................... | H02K 15/06 310/198 |
| 2009/0230806 A1 | 9/2009 | Miyata et al. | |
| 2012/0206082 A1* | 8/2012 | Huang .................. | H02K 17/12 318/807 |
| 2014/0319957 A1* | 10/2014 | Hao ....................... | H02K 17/16 310/211 |
| 2017/0363096 A1 | 12/2017 | Fleming et al. | |
| 2018/0109155 A1 | 4/2018 | Munoz et al. | |
| 2018/0205302 A1* | 7/2018 | Gieras ................. | H02K 1/2786 |
| 2019/0238010 A1* | 8/2019 | Iki ............................ | H02K 9/22 |

OTHER PUBLICATIONS

Notification of Transmittal of the International Search Report and the Written Opinion of the International Searching Authority, or the Declaration for PCT/US 19/50860, dated Dec. 5, 2019.

* cited by examiner

*Primary Examiner* — Thomas Truong (57) ABSTRACT

An induction motor may include a stator assembly and a rotor assembly that revolves or rotates around the state assembly. Additionally, a pole pitch of the induction motor may be less than two inches. The stator assembly may also optionally include a fractional slot winding.

29 Claims, 5 Drawing Sheets

INDUCTION MOTOR FOR USE IN DRONES

CROSS-REFERENCE TO RELATED APPLICATION

This application claims priority to U.S. Provisional Application No. 62/739,566, filed Sep. 13, 2018 and entitled "Induction Motor for Use in Drones," the contents of which is incorporated by reference herein in its entirety.

TECHNICAL FIELD

Embodiments of the disclosure relate generally to rotating electric machines and, more particularly, to induction motors or other rotating electric machines suitable for use in drones and other aerial vehicles.

BACKGROUND

Unmanned aerial vehicles, such as drones, are utilized in a wide variety of applications. Conventional drones are typically powered by brushless direct current ("DC") motors, such as motors that use permanent magnets to generate an electromagnetic field. However, permanent magnet motors are relatively expensive and, therefore, increase the overall cost of an aerial vehicle. Accordingly, there is an opportunity for improved motors for use in drone and other aerial vehicle applications. In particular, there is an opportunity for improved induction motors suitable for use in aerial vehicle applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to induction motors that may be utilized in aerial vehicle applications, such as drone and other unmanned aerial vehicle applications. An induction motor, also referred to as an asynchronous motor, may be an alternating current ("AC") motor in which an electric current in a rotor needed to produce torque is obtained by electromagnetic induction from the magnetic field of a stator winding.

The induction motor may include a stator assembly and a rotor assembly. In certain embodiments, the rotor assembly may be positioned outside or around the stator assembly. In other words, the motor may have an out runner design. Additionally, according to an aspect of the disclosure, the motor may include a relatively small pole pitch. For example, the motor may have a pole pitch that is less than approximately two inches. In certain embodiments, the motor may also include a fractional slot winding. In other words, the slots per pole per phase of the motor may be a non-integer or fractional number. A fractional slot winding may contribute to the relatively small pole pitch of the motor.

The current loading of a motor is inversely proportional to the pole pitch of the motor. As a result of having a relatively small pole pitch, induction motors in accordance with embodiments of the disclosure may have higher current and power density relative to conventional motors. Accordingly, an induction motor may be formed as a relatively small motor that is capable of generating more power relative to conventional induction motors. Thus, the induction motor may be suitable for use with drones and/or other unmanned aerial vehicle applications. Further, the induction motor may be manufactured with copper or metallic windings and/or rotor bars.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
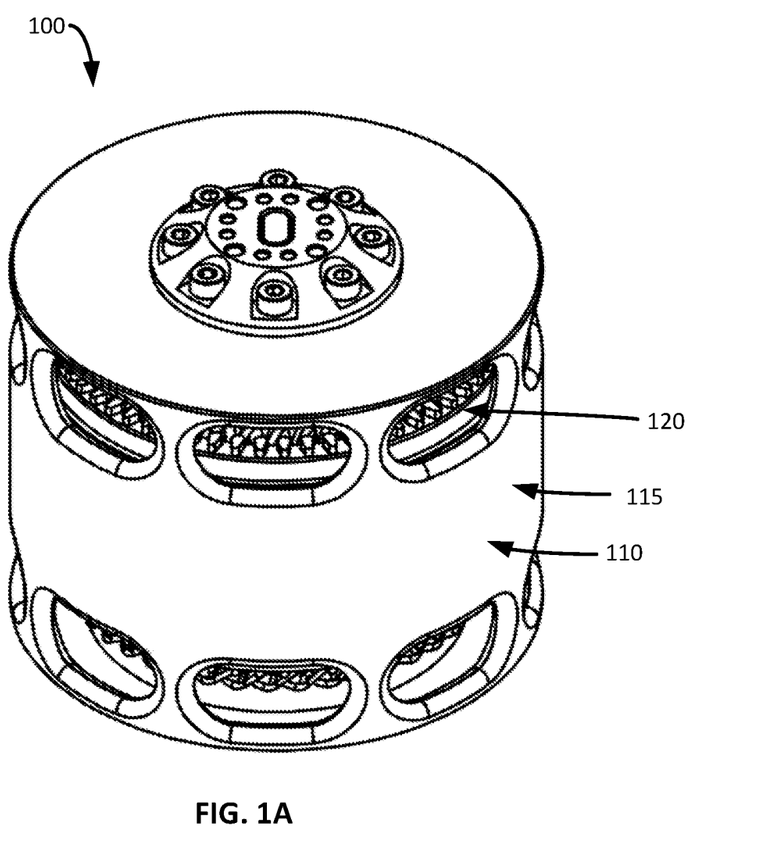
FIGS. 1A-1C depict perspective, side, and cross-sectional views of an example induction motor, according to an illustrative embodiment of the disclosure.
Figure 1B:
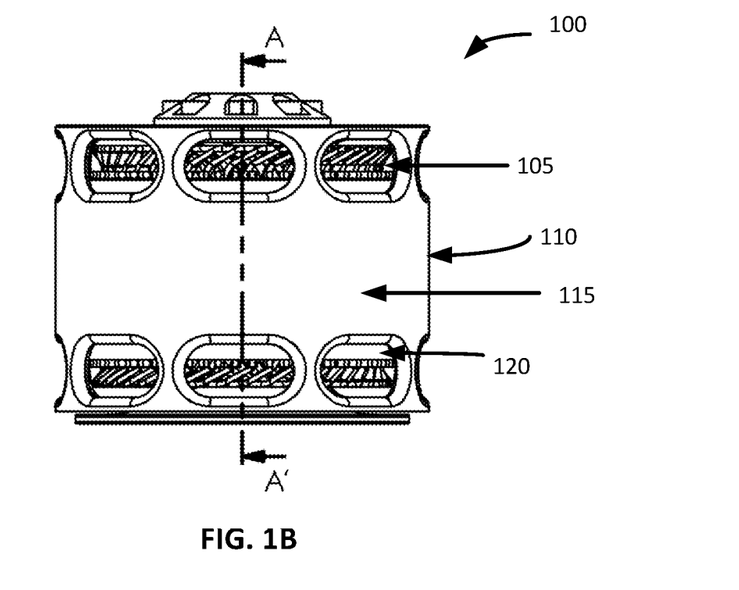
Figure 1C:
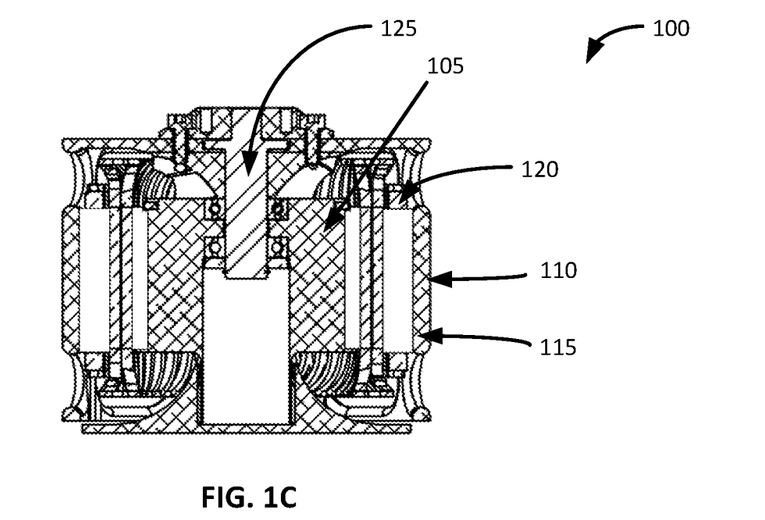

With reference to FIG. 1A, a perspective view of an example induction motor 100 is illustrated in accordance with an embodiment of the disclosure. FIG. 1B illustrates a side view of the motor 100, and FIG. 1C illustrates a cross-sectional view of the motor 100 taken along line A-A'. The motor 100 may include a stator assembly 105 and a rotor assembly 110. The rotor assembly 110 may be positioned outside or around the stator assembly 105. In other words, the motor 100 may include an out runner design in which the rotor assembly 110 revolves or rotates around the stator assembly 105. In operation, the stator assembly 105 may function as a stationary portion of the motor 100 which produces electrical torque, and the rotor assembly 110 may function as a rotational portion of the motor 100 which produces electrical torque.

As explained in greater detail below with reference to FIGS. 2A-2B, the stator assembly 105 may include a plurality of wires or windings that are positioned in slots spaced around an outer perimeter of the stator assembly 105. These windings may interact with bars, rods, or similar structures in the rotor assembly in order to produce electrical torque. A number of magnetic poles in the motor 100 may be defined by the number of times that the magnetic flux passes from the rotor to the stator and vice versa. The pole pitch of the motor may be the circular arc or other distance along a circumferential direction in an air gap between the stator assembly 105 and the rotor assembly 110 that defines or corresponds to one magnetic pole of the motor 100.

The motor 100 may include any suitable number of poles as desired in various embodiments. For example, the motor 100 may include 4, 6, 8, 10, 12, 14, or 16 poles, a number of poles included in a range between any two of the above values (e.g., between 4 and 12 poles, between 10 and 12 poles, etc.), or a number of poles included in a range bounded on either a minimum or maximum end by one of the above values (e.g., 10 or more poles, etc.). According to an aspect of the disclosure, the motor 100 may have a relatively small pole pitch, such as a pole pitch that is less than approximately two (2) inches. With the current loading of the motor 100 being inversely proportional to the pole pitch, the relatively small pole pitch may facilitate a relatively higher power density and/or power output of the motor 100.

The rotor assembly 110 may include a rotor frame 115 and a rotor cage 120. The rotor frame 115 may provide support for the rotor cage 120 and/or the motor 100. The rotor cage 120 may be positioned within the rotor frame 115. For example, the rotor cage may be thermally press fit or otherwise joined or coupled to the rotor frame 115. The rotor cage 120 may include a plurality of circumferentially spaced rotor bars, rods, or other structures that interact with the stator assembly 105 as the rotor assembly 110 rotates in order to produce electrical torque.

Additionally, at least one shaft 125 may be positioned within a channel that extends at least partially through the stator assembly 105. For example, a channel may extend longitudinally through the stator assembly 105, and a shaft 125 may be positioned within the channel. The shaft 125 may then be connected to one or both ends of the rotor frame 115, thereby facilitating rotation of the rotor assembly 110 around the stator assembly 105. As desired, any suitable number of bearings may be utilized to bear friction as the rotor assembly 110 rotates.

The motor 100 may be produced from a wide variety of suitable materials and/or combinations of materials. A few example materials are described in greater detail below. Additionally, the motor 100 may be produced with a wide variety of suitable dimensions. For example, the motor 100 may have any suitable length, diameter, cross-sectional area, and/or volume. A volume and/or other dimensions of the motor 100 may also be scalable based at least in part upon desired power density. A number of poles in the motor 100 may be modified as the motor size is scaled in order to maintain a desired pole pitch.

Example stator assemblies, rotor frames, and rotor cages are described in greater detail below with reference to FIGS. 2A-4B. Each of the example components may be incorporated into a motor in accordance with various embodiments of the disclosure, such as the motor 100 depicted in FIGS. 1A-1C. In other embodiments of the disclosure, suitable variations of the example components may be incorporated into a motor. Indeed, a wide variety of suitable stator assemblies and/or rotor assemblies may be into a motor as desired in various embodiments.

The motor 100 illustrated in FIGS. 1A-1C is provided by way of example only. Embodiments of the disclosure contemplate a wide variety of other motor constructions. These other motors may include more or less components than the motor 100 illustrated in FIGS. 1A-1C. For example, other motors may include alternative winding configurations and/or rotor assembly construction. Additionally, certain components may have different dimensions, configurations, and/or materials than the components illustrated in FIGS. 1A-1C.

Figure 2A:
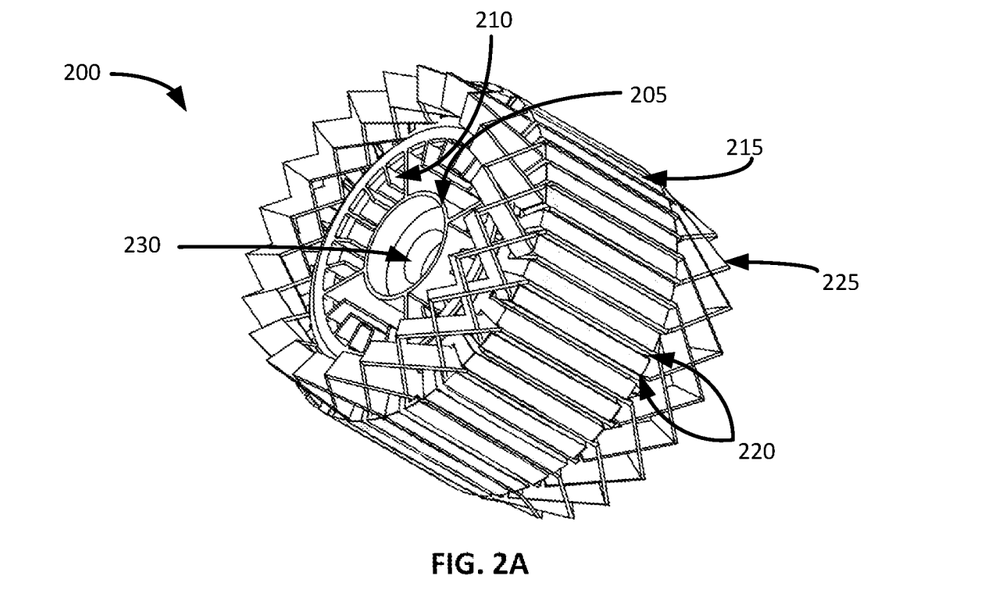
FIGS. 2A-2B depict perspective and cross-sectional views of an example stator assembly that may be incorporated into an induction motor, according to an illustrative embodiment of the disclosure.
Figure 2B:
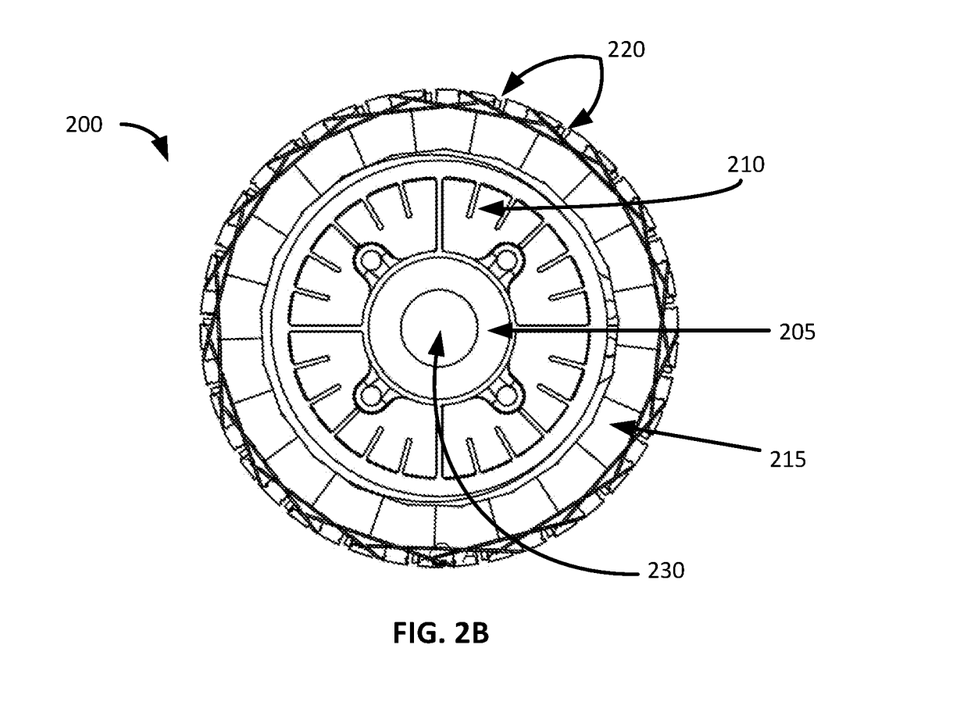

Turning now to FIGS. 2A-2B, an example stator assembly 200 suitable for use in an induction motor, such as the induction motor 100 of FIGS. 1A-1C, is illustrated. In certain embodiments, the stator assembly 200 may be utilized as the stator assembly 105 described above with reference to FIGS. 1A-1C. FIG. 2A depicts a perspective view of the example stator assembly 200, and FIG. 2B depicts a cross-sectional view of the example stator assembly 200 taken at a point along a longitudinal direction of the stator assembly 200.

The stator assembly 200 may include an internal frame 205, a heat exchanger 210, a slot structure 215 that includes a plurality of slots 220, and a plurality of windings 225 positioned within the slots 220. The internal frame 205 may provide mechanical support for the stator assembly 200. The internal frame 205 may be formed with a wide variety of suitable cross-sectional shapes and/or other dimensions as desired in various embodiments. Additionally, the internal frame 205 may be formed from a wide variety of suitable materials and/or combinations of materials. Examples of suitable materials include, but are not limited to, aluminum, steel, other metallic materials, metallic alloys, carbon nanotubes, plastics, composite materials, etc.

The internal frame 205 may also include one or more channels 230 that extend along a longitudinal direction of the stator assembly 200. For example, a channel 230 may longitudinally extend along a line running approximately through a center point of the stator assembly 200. A channel 230 may have any suitable diameter, cross-sectional area, and/or other dimensions. Each channel 230 may be configured to receive at least one shaft that extends at least partially through the stator assembly 200. For example, a channel may extend longitudinally through the stator assembly 200, and a shaft may be positioned within the channel. The shaft may then be connected to one or both ends of a rotor frame, thereby facilitating rotation of a rotor assembly around the stator assembly 200. As desired, any suitable number of bearings may be utilized to bear friction as the rotor assembly rotates.

With continued reference to the stator assembly 200, the heat exchanger 210 may facilitate internal cooling within the stator assembly 200. In certain embodiments, the heat exchanger 210 may be formed as an integral component with the internal frame 205. As such, the heat exchanger 210 may be formed from the same material(s) as the internal frame 205. In other embodiments, the heat exchanger 210 may be affixed or otherwise connected to the internal frame 205. As desired, the heat exchanger 210 may be formed from the same material(s) as the internal frame 205 and/or from different material(s). Regardless of whether the heat exchanger 210 is formed as an integral or separate component with respect to the internal frame 205, the heat exchanger 210 may be formed from a wide variety of suitable materials. Examples of suitable materials include, but are not limited to, aluminum, steel, carbon steel, copper, brass, other metallic materials, carbon nanotubes, etc.

The heat exchanger 210 may include any number of fins, modulations, cooling surfaces, and/or other features that facilitate cooling of the stator assembly 200 and/or an associated motor. As desired, the heat exchanger 210 may be formed with a wide variety of suitable combinations and/or constructions of cooling surfaces. Additionally, in certain embodiments, the heat exchanger 210 may facilitate cooling of the stator assembly 200 via convective heat transfer via a suitable gas flow (e.g., an air flow) within and/or through the stator assembly 200.

The slot structure 215 may be positioned adjacent to the heat exchanger 210, and the slot structure 215 may include a plurality of slots 220 into which windings 225 may be positioned. The slot structure 215 may be formed from a wide variety of suitable materials and/or combinations of materials. In certain embodiments, the slot structure 215 may be formed from electrical steel, lamination steel, silicon electrical steel, or silicon steel. Electrical steel may be tailored to produce specific properties within the stator assembly 200 and/or a motor, such as a small hysteresis area resulting in low power loss per cycle, low core loss, and/or high permeability.

In certain embodiments, the slot structure 215 may be formed as a laminated structure. In other words, the slot structure 215 may be formed from a plurality of sections or discs (e.g., sections of electrical steel, etc.) that are stacked on one another along a longitudinal direction of the stator assembly 200 (e.g., a direction that is parallel to that of the one or more channels 230, etc.). Any number of sections may be utilized to form the slot structure as desired in various embodiments of the disclosure. Additionally, each section may have any suitable thickness, such as a thickness of approximately 0.078 inches (approximately 2 mm) or less.

The slot structure 215 may include a plurality of slots 220 positioned along or proximate to an outer periphery of the slot structure 215. Each slot (generally referred to as slot 220) may be configured to receive a suitable wire or winding. In certain embodiments, each slot 220 may extend along or parallel to a longitudinal direction of the stator assembly 200. In other embodiments, one or more slots 220 may be formed at one or more desired angles relative to the longitudinal direction. Any number of slots 220 may be formed in the slot structure 215 as desired in various embodiments. In certain embodiments, a number of slots 220 and corresponding windings 225 may be based at least in part upon a desired pole pitch for a motor incorporating the stator assembly 200.

A respective winding 225 or wire may be positioned within each of the slots 220 of the slot structure 215. Each winding 225 may include one or more electrical conductors that are shaped into any desired configuration (e.g., individual conductors, coils, etc.). Additionally, each winding 225 may be formed from a wide variety of suitable materials and/or combinations of materials. For example, each winding 225 may include one or conductors (e.g., copper, aluminum, silver, metallic conductors, metallic alloy conductors, carbon nanotube conductors, etc.) that are insulated with any number of suitable layers of insulation, such as enamel or extruded thermoplastic insulation. Each winding 225 may also be formed with any suitable dimensions, such as any suitable cross-sectional shape (e.g., rectangular, circular, etc.), cross-sectional area, etc. As desired, each slot 220 may also be formed with any suitable dimensions in order to facilitate positioning or insertion of an associated winding.

A wide variety of suitable patterns may be formed by the windings 225 as desired in various embodiments. For example, the windings 225 may be arranged in a distributed configuration, such as a multiphase winding distributed throughout the slots 220 to result in the generation of a sine wave. In other words, a motor incorporating the stator structure 200 may be configured to generate a sinusoidal flux.

In certain embodiments, the windings 225 may be arranged in a wave winding configuration. For example, the windings 225 may be passed through the slots 220 in a serpentine manner. In other embodiments, the windings 225 may be formed as hairpins that are positioned within the slots 220. In yet other embodiments, the windings 225 may be arranged in a lap winding configuration. Indeed, a wide variety of suitable winding arrangements and/or configurations may be utilized as desired in various embodiments. In other words, a wide variety of winding configurations may be utilized to form an induction motor with a relatively small pole pitch. The disclosure is not limited to any particular winding configuration, and those discussed herein are provided by way of non-limiting example only.

According to an aspect of the disclosure, a motor incorporating the stator assembly 200 may have a pole pitch of less than approximately two (2) inches. In various embodiments, the motor may have a pole pitch of less than approximately 2, 1.8, 1.6, 1.5, 1.4, 1.2, 1.1, or 1.0 inches, or a pole pitch included in a range between any two of the above values. Standard conventional practice for induction motors is for a pole pitch to be between two and twelve inches. Further, higher pole count conventional designs typically have pole pitches that are greater than four inches. With the current loading of a motor being inversely proportional to the pole pitch, the relatively small pole pitch described herein may facilitate a relatively higher power density and/or power output of a motor.

A number of magnetic poles in a motor may be defined by the number of times that the magnetic flux passes from a rotor assembly to the stator assembly 200 and vice versa. Once incorporated into a motor, an air gap will be present between the stator assembly 200 and a rotor assembly that revolves around the stator assembly 200. The pole pitch of the motor may be the circular arc or other distance along a circumferential direction within the air gap between the stator assembly 200 and a rotor assembly that defines or corresponds to one magnetic pole of the motor. A motor incorporating the stator assembly 200 may include any suitable number of poles as desired in various embodiments. For example, the motor may include 4, 6, 8, 10, 12, 14, or 16 poles, a number of poles included in a range between any two of the above values (e.g., between 4 and 12 poles, etc.), or a number of poles included in a range bounded on either a minimum or maximum end by one of the above values (e.g., 10 or more poles, etc.). In certain embodiments, the pole pitch of a motor may be approximately equal to the circumferential perimeter of the air gap divided by the number of poles included in the motor.

Additionally, in certain embodiments, a motor incorporating the stator assembly 200 may have a fractional slot winding. A fractional slot winding of a motor may be characterized as a non-integer number of slots per pole per phase within the motor. Conventional literature for induction motors recommends against the use of a fractional slot winding. However, it was found that a fractional slot winding may assist in the achievement of a relatively small pole pitch (e.g., a pole pitch of less than two inches). In certain embodiments, a fractional slot winding may result from or be based at least in part upon the windings 225 of the stator assembly interacting with a relatively high number of rotor bars that are incorporated into a rotor cage.

As set forth above, a stator assembly 200 may include any number of suitable winding slots 220. Additionally, a motor may be produced that has any number of suitable poles. The number of electrical phases may be based upon a number of phase shifted voltage leads that are applied to the motor. As one non-limiting example of a fractional slot winding, a stator assembly 200 may include 42 slots, and a motor incorporating the stator assembly 200 may have ten (10) poles. For a three-phase motor, the stator assembly 200 may have a fractional slot winding with 1.4 slots per pole per phase (e.g., 42/10/3). A wide variety of other configurations having a fractional slot winding may be utilized as desired.

The stator assembly 200 illustrated in FIGS. 2A-2B is provided by way of example only. Embodiments of the disclosure contemplate a wide variety of other stator assembly constructions. These other stator assemblies may include more or less components than the stator assembly 200 illustrated in FIGS. 2A-2B. For example, other stator assemblies may include alternative winding configurations and/or heat exchangers. Additionally, certain components may have different dimensions, configurations, and/or materials than the components illustrated in FIGS. 2A-2B.

Figure 3:
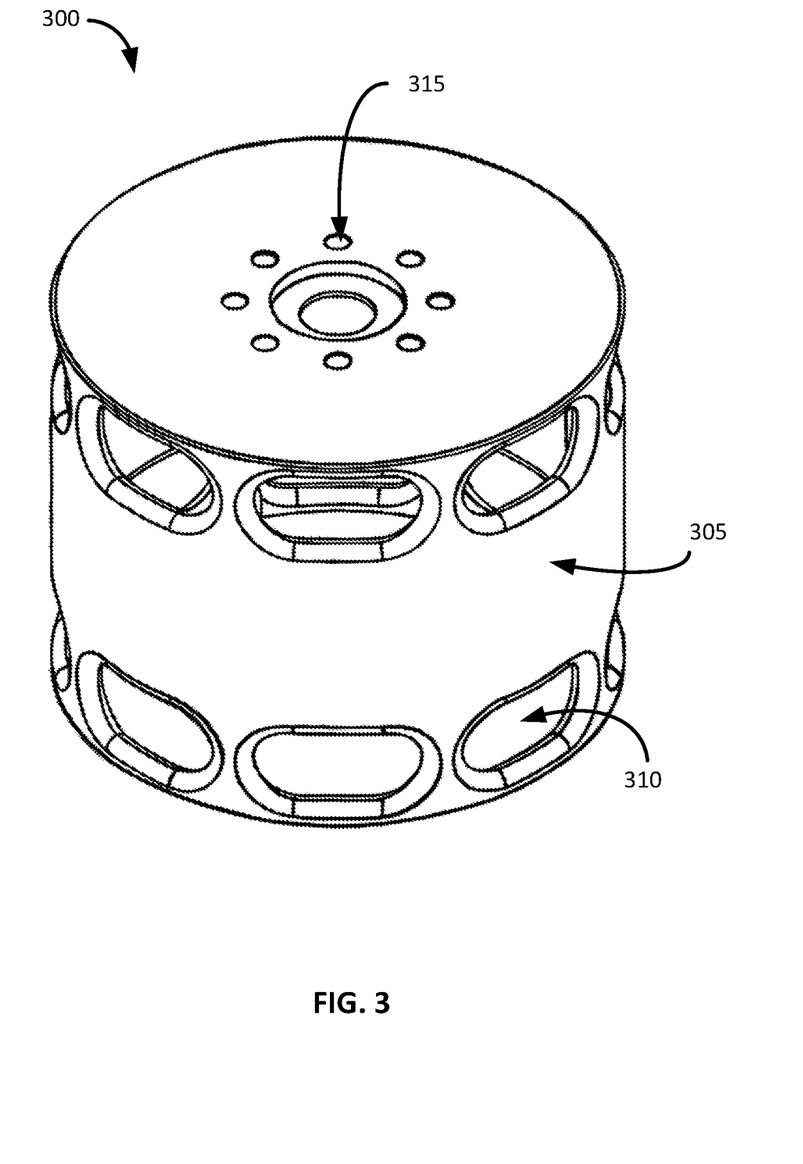
FIG. 3 is a perspective view of an example rotor frame that may be incorporated into an induction motor, according to an illustrative embodiment of the disclosure.

As set forth in greater detail above with reference to FIGS. 1A-1C, a rotor assembly may revolve or rotate around a stator assembly within a motor. Additionally, the rotor assembly may include a rotor frame and a rotor cage positioned within the rotor frame. Turning now to FIG. 3, an example rotor frame 300 suitable for use in an induction motor, such as the induction motor 100 of FIGS. 1A-1C, is illustrated. In certain embodiments, the rotor frame 300 may be utilized as the rotor frame 115 described above with reference to FIGS. 1A-1C. FIG. 3 depicts a perspective view of the example rotor frame 300.

The rotor frame 300 may provide structural support for a rotor assembly and a rotor cage positioned within the rotor frame 300. Additionally, in certain embodiments, the rotor frame 300 may facilitate and/or assist in cooling a motor. The rotor frame 300 may include a body portion 305 formed from any number of suitable components. In certain embodiments, the body portion 305 may be formed as a single or unitary component. In other embodiments, the body portion 305 may include a plurality of components or sections that are joined or connected to one another. The body portion 305 may house an associated rotor cage. The rotor cage and the rotor frame 300 may be configured to rotate around a stator assembly within a motor.

The body portion 305 may be formed with a wide variety of suitable dimensions, such as any suitable longitudinal length, diameter, and/or cross-sectional area. Additionally, the body portion 305 may be formed from a wide variety of suitable materials and/or combinations of materials. Examples of suitable materials include, but are not limited to, aluminum, steel, other metallic materials, metallic alloys, composite materials, plastics, carbon nanotubes, etc.

In certain embodiments, one or more openings 310, gaps, or spaces may be formed through the body portion 305. For example, one or more openings 310 may be formed along a circumferential surface of the body portion 305. The opening(s) 310 may facilitate cooling of a motor incorporating the rotor frame 300 while also reducing the weight of the rotor frame 300. Any suitable number of openings 310 may be formed through the body portion 305 as desired in various embodiments. Additionally, the openings 310 may be arranged in a wide variety of suitable patterns and/or other configurations. FIG. 3 illustrates a rotor fame 300 having openings that are spaced around an outer periphery of the body portion 305 near opposite longitudinal ends of the body portion 305. However, a wide variety of other configurations of openings may be utilized in other embodiments. Additionally, each opening 310 may be formed with any suitable dimensions. In certain embodiments, the plurality of openings 310 may have approximately equal dimensions. In other embodiments, at least two openings may have different dimensions.

When incorporated into a motor, such as the motor, the rotor frame 300 may be connected to a shaft. For example, a shaft may extend through a stator assembly of the motor, and the shaft may be connected to the rotor frame 300. In certain embodiments, the rotor frame 300 may be connected to the shaft at or near one longitudinal end of the body portion 305. In other embodiments, the rotor frame 300 may be connected to the shaft at or near both longitudinal ends of the body portion 305. In yet other embodiments, the rotor frame 300 may be connected to two separate shafts at respective longitudinal ends of the body portion 305.

A wide variety of suitable connection or joining mechanisms may be utilized to connect a rotor frame 300 to one or more shafts. In certain embodiments, the body portion 305 may be formed with one or more suitable cavities configured to receive one or more shaft end portions. As desired in various embodiments, one or more physical attachment mechanisms, such as one or more bolts, pins, or similar components, may be utilized to secure a rotor frame 300 to one or more shafts. For example, one or more physical attachment mechanisms may be positioned within corresponding receptacle openings 315 (e.g., threaded screw slots, etc.) to secure the rotor frame 300 to one or more shafts.

The rotor frame 300 illustrated in FIG. 3 is provided by way of example only. Embodiments of the disclosure contemplate a wide variety of other rotor frame constructions. These other rotor frames may include more or less components than the rotor frame 300 illustrated in FIG. 3. For example, other rotor frames may include alternative configurations of openings that facilitate cooling and/or alternative arrangements for joining the rotor frame to a shaft. Additionally, certain components may have different dimensions, configurations, and/or materials than the components illustrated in FIG. 3.

Figure 4A:
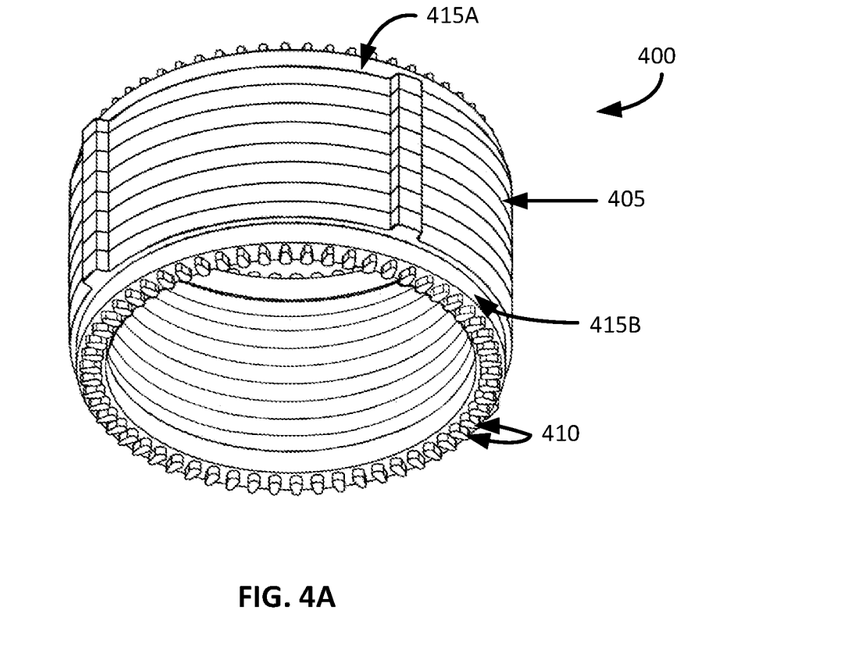
FIGS. 4A-4B depict perspective and cross-sectional views of an example rotor cage that may be incorporated into an induction motor, according to an illustrative embodiment of the disclosure.
Figure 4B:
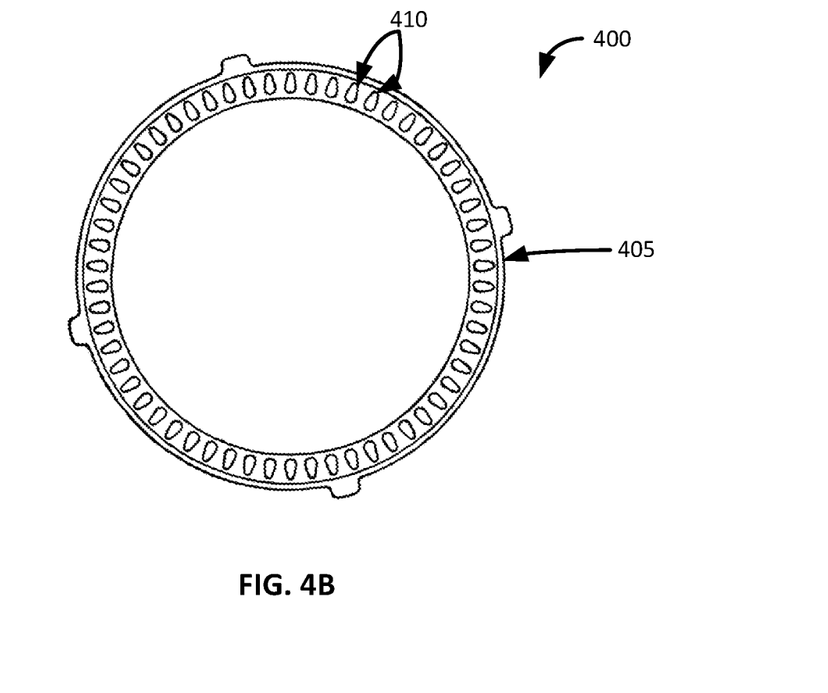

Turning now to FIGS. 4A-4B, an example rotor cage 400 suitable for use in an induction motor, such as the induction motor 100 of FIGS. 1A-1C, is illustrated. In certain embodiments, the rotor cage 400 may be utilized as the rotor cage 120 described above with reference to FIGS. 1A-1C. FIG. 4A depicts a perspective view of the example rotor cage 400, and FIG. 4B depicts a cross-sectional view of the example rotor cage 400 taken at a point along a longitudinal direction of the rotor cage 400.

The rotor cage 400 may be positioned or housed within a suitable rotor frame to form a rotor assembly, and the rotor assembly may revolve around a stator assembly within a motor. The rotor cage 400 may also include one or more conductive components that operate in conjunction with the windings of a stator assembly in order to produce electrical torque. For example, the rotor cage 400 may include a rotor core 405, and a plurality of rotor bars 410 may be circumferentially spaced around the rotor cage 400 within the rotor core 405. The rotor bars 410 may interact with the windings of a stator assembly during operation of an induction motor. In certain embodiments, the rotor cage 400 may be characterized as a squirrel-cage.

The rotor core 405 may include a plurality of slots or cavities into which respective rotor bars 410 are positioned. The rotor core 405 may be formed from a wide variety of suitable materials and/or combinations of materials. In certain embodiments, the rotor core 405 may be formed from electrical steel, lamination steel, silicon electrical steel, or silicon steel. Electrical steel may be tailored to produce specific properties within the rotor cage 400 and/or a motor, such as a small hysteresis area resulting in low power loss per cycle, low core loss, and/or high permeability.

In certain embodiments, the rotor core 405 may be formed as a laminated structure. In other words, the rotor core 405 may be formed from a plurality of sections or discs (e.g., sections of electrical steel, etc.) that are stacked on one another along a longitudinal direction of the rotor core 405

(e.g., a direction that is parallel to that of a shaft that a rotor assembly revolves around, etc.) Any number of sections may be utilized to form the rotor core 405 as desired in various embodiments of the disclosure. Additionally, each section may have any suitable thickness, such as a thickness of approximately 0.078 inches (approximately 2 mm) or less.

A plurality of rotor bars 410 may be positioned within respective slots or cavities formed through the rotor core 405. For example, a plurality of rotor bars 410 may be circumferentially spaced around the rotor core 405. Each rotor bar (generally referred to as rotor bar 410) may include at least one suitable conductor. Additionally, each rotor bar 410 may be formed from a wide variety of suitable materials and/or combinations of materials. For example, each rotor bar 410 may be formed from copper, aluminum, silver, metallic conductors, metallic alloy conductors, carbon nanotube conductors, and/or other suitable materials. Each rotor bar 410 may also be formed with a wide variety of cross-sectional shapes, cross-sectional areas and/or other dimensions. As desired, each slot within the rotor core 405 may also be formed with any suitable dimensions in order to facilitate positioning or insertion of an associated rotor bar 410.

Any number of rotor bars 410 may be incorporated into a rotor cage 400 as desired in various embodiments. In certain embodiments, the number of rotor bars 410 and/or the dimensions of rotor bars 410 may be selected in order to attain a desired number of poles and/or pole pitch within an induction motor. Additionally, any number of rotor bars 410 may be provided for each pole within a motor. For example, a motor may include 2, 3, 4, 5, 6, 7, 8, 9, or 10 rotor bars for each pole, a number of rotor bars included in a range between any two of the above values (e.g., between approximately 3 and approximately 7 rotor bars per pole), or a number of rotor bars included in a range bounded on either a minimum or maximum end by one of the above values. In the example rotor cage 400 illustrated in FIGS. 4A-4B, fifty-eight (58) rotor bars may be utilized, and a motor incorporating the rotor cage 400 may be formed with between 10 and 12 poles. Other suitable numbers of rotor bars 410 may be utilized as desired.

In certain embodiments, each rotor bar 410 may extend along or parallel to a longitudinal direction of the rotor cage 400. In other embodiments, one or more rotor bars 410 may be formed at one or more desired angles (e.g., skew angles) relative to the longitudinal direction. For example, the rotor bars 410 may be skewed at an angle relative to the longitudinal direction of approximately one rotor slot (i.e., the space between two adjacent rotor slots). Other suitable angles may be utilized, such as a quarter slot, a half slot, two slots, three slots, etc. Additionally, each rotor bar 410 may be continuous along a length of the rotor cage 400. The rotor bars 410 may also be connected in parallel to one another at opposite ends (i.e., at a top and a bottom end) of the rotor cage 400 by suitable rotor rings 415A, 415B. The rotor rings 415A, 415B may also provide structural support for the laminated rotor core 405 and/or the rotor cage 400. The rotor rings 415A, 415B may be formed from any suitable conductive materials, such as copper, aluminum, silver, metallic conductors, metallic alloy conductors, carbon nanotube conductors, and/or other suitable materials. In certain embodiments, the rotor rings 415A, 415B may be formed from the same material(s) as the rotor bars 410. In other embodiments, the rotor rings 415A, 415B and the rotor bars 410 may be formed from different materials.

The rotor bars 410 may be formed with a wide variety of suitable cross-sectional shapes as desired in various embodiments. For purposes of this disclosure, the cross-sectional shape of a rotor bar 410 may refer to a cross-sectional shape taken along a longitudinally extending direction of the rotor bar 410. As shown in FIG. 4A-4B, each rotor bar 410 may have a teardrop cross-sectional shape. In certain embodiments, the teardrop rotor bars 410 may facilitate operation of an outrunner motor at relatively high tip seeps (e.g., the speeds at which the outside edge of the rotor assembly rotates), such as tip speeds exceeding approximately 400 m/s. Other suitable cross-sectional shapes for rotor bars 410 may be utilized in other embodiments, such as rectangular, circular, or elliptical cross-sectional shapes.

During construction of a rotor assembly, the rotor cage 400 may be coupled to a rotor frame, such as the rotor frame 300 illustrated in FIG. 3, utilizing a wide variety of suitable methods and/or techniques. In certain embodiments, the rotor cage 400 may be thermally press fit within a rotor frame. For example, the rotor frame may be heated while the rotor cage 400 is cooled to facilitate thermal press fitting of the cage 400 within the frame. In other embodiments, one or more suitable physical connection devices may be utilized to couple the rotor cage 400 to a rotor frame. For example, one or more splines, circumferential tabs or keys, and/or other suitable coupling components may be utilized to couple the rotor cage 400 to a rotor frame. In yet other embodiments, a combination of coupling components and thermal press fitting may be utilized.

The rotor cage 400 illustrated in FIGS. 4A-4B is provided by way of example only. Embodiments of the disclosure contemplate a wide variety of other rotor cage constructions. These other rotor cages may include more or less components than the rotor cage 400 illustrated in FIG. 4A-4B. For example, other rotor cages may include alternative numbers of rotor bars and/or rotor bar dimensions (e.g., cross-sectional shapes, cross-sectional areas, etc.). Additionally, certain components may have different dimensions, configurations, and/or materials than the components illustrated in FIGS. 4A-4B.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An induction motor comprising:
 a stator assembly comprising a plurality of circumferentially spaced conductive windings; and
 a rotor assembly configured to rotate around the stator assembly, the rotor assembly comprising a plurality of circumferentially spaced conductive bars that interact with the plurality of windings to produce a magnetic field, wherein the stator assembly and the rotor assembly form an alternating current asynchronous induction motor, and wherein the induction motor comprises a magnetic pole pitch within the gap between the stator assembly and the rotor assembly of less than two inches.

2. The induction motor of claim 1, wherein the induction motor comprises a fractional slot winding.

3. The induction motor of claim 1, wherein the plurality of windings are arranged in a distributed winding configuration.

4. The induction motor of claim 1, wherein the plurality of windings are arranged in a wave winding configuration.

5. The induction motor of claim 1, wherein the stator assembly further comprises a heat exchanger positioned between the plurality of windings.

6. The induction motor of claim 1, wherein the induction motor comprises a magnetic pole pitch of less than 1.5 inches.

7. The induction motor of claim 1, wherein the rotor assembly comprises a rotor frame and a rotor cage positioned within the rotor frame.

8. The induction motor of claim 1, wherein the plurality of conductive bars comprise at least one bar having a teardrop cross-sectional shape.

9. The induction motor of claim 1, wherein the induction motor comprises between four and twelve magnetic poles.

10. The induction motor of claim 9, wherein the plurality of conductive bars comprises between three and seven conductive bars per magnetic pole.

11. An induction motor comprising:
a stator assembly comprising a plurality of circumferentially spaced conductive windings; and
a rotor assembly configured to rotate around the stator assembly, the rotor assembly comprising a plurality of circumferentially spaced conductive bars that interact with the plurality of windings to produce a magnetic field, wherein the stator assembly and the rotor assembly form an alternating current asynchronous induction motor, and
wherein the induction motor comprises a magnetic pole pitch within the gap between the stator assembly and the rotor assembly of less than two inches, and
wherein the motor comprises a fractional slot winding.

12. The induction motor of claim 11, wherein the plurality of windings are arranged in a distributed winding configuration.

13. The induction motor of claim 11, wherein the plurality of windings are arranged in a wave winding configuration.

14. The induction motor of claim 11, wherein the stator assembly further comprises a heat exchanger positioned between the plurality of windings.

15. The induction motor of claim 11, wherein the induction motor comprises a magnetic pole pitch of less than 1.5 inches.

16. The induction motor of claim 11, wherein the rotor assembly comprises a rotor frame and a rotor cage positioned within the rotor frame.

17. The induction motor of claim 11, wherein the plurality of conductive bars comprise at least one bar having a teardrop cross-sectional shape.

18. The induction motor of claim 11, wherein the induction motor comprises between four and twelve magnetic poles.

19. The induction motor of claim 18, wherein the plurality of conductive bars comprises between three and seven conductive bars per magnetic pole.

20. An induction motor comprising:
a stator assembly comprising a plurality of circumferentially spaced conductive windings; and
a rotor assembly comprising a plurality of circumferentially spaced conductive bars that interact with the plurality of windings as the rotor assembly rotates to produce a magnetic field, wherein the stator assembly and the rotor assembly form an alternating current asynchronous induction motor, and
wherein the induction motor comprises a magnetic pole pitch within the gap between the stator assembly and the rotor assembly of less than two inches, and
wherein the induction motor comprises a fractional slot winding.

21. The induction motor of claim 20, wherein the rotor assembly rotates around the stator assembly.

22. The induction motor of claim 20, wherein the plurality of windings are arranged in a distributed winding configuration.

23. The induction motor of claim 20, wherein the plurality of windings are arranged in a wave winding configuration.

24. The induction motor of claim 20, wherein the stator assembly further comprises a heat exchanger positioned between the plurality of windings.

25. The induction motor of claim 20, wherein the induction motor comprises a magnetic pole pitch of less than 1.5 inches.

26. The induction motor of claim 20, wherein the rotor assembly comprises a rotor frame and a rotor cage positioned within the rotor frame.

27. The induction motor of claim 20, wherein the plurality of conductive bars comprise at least one bar having a teardrop cross-sectional shape.

28. The induction motor of claim 20, wherein the induction motor comprises between four and twelve magnetic poles.

29. The induction motor of claim 28, wherein the plurality of conductive bars comprises between three and seven conductive bars per magnetic pole.

* * * * *